United States Patent
Jin et al.

(10) Patent No.: US 7,800,570 B2
(45) Date of Patent: Sep. 21, 2010

(54) LCD DEVICE CAPABLE OF CONTROLLING A VIEWING ANGLE AND METHOD FOR DRIVING THE SAME

(75) Inventors: Hyun Suk Jin, Anyang-si (KR); Hyung Seok Jang, Seongnam-si (KR)

(73) Assignee: LG. Display Co., Ltd., Seoul (KR)

( * ) Notice: Subject to any disclaimer, the term of this patent is extended or adjusted under 35 U.S.C. 154(b) by 743 days.

(21) Appl. No.: 11/478,977

(22) Filed: Jun. 29, 2006

(65) Prior Publication Data

US 2007/0152930 A1   Jul. 5, 2007

(30) Foreign Application Priority Data

Dec. 29, 2005   (KR)   .................. 10-2005-0133926

(51) Int. Cl.
*G09G 3/36* (2006.01)
*G02F 1/1347* (2006.01)

(52) U.S. Cl. .................. 345/94; 349/83; 349/77

(58) Field of Classification Search .......... 345/87–104, 345/690, 629; 349/49–102
See application file for complete search history.

(56) References Cited

U.S. PATENT DOCUMENTS

| | | | | |
|---|---|---|---|---|
| 6,285,428 B1 * | 9/2001 | Kim et al. | .................. | 349/141 |
| 6,469,765 B1 * | 10/2002 | Matsuyama et al. | ......... | 349/143 |
| 7,068,336 B2 * | 6/2006 | Oh et al. | .................... | 349/123 |
| 7,468,770 B2 * | 12/2008 | Okumura | .................... | 349/123 |

FOREIGN PATENT DOCUMENTS

WO   WO 03/075077   *   9/2003

* cited by examiner

*Primary Examiner*—Bipin Shalwala
*Assistant Examiner*—Keith Crawley
(74) *Attorney, Agent, or Firm*—Brinks Hofer Gilson & Lione

(57) ABSTRACT

An LCD device is disclosed in which the LCD device is driven in an FFS mode and a VAC mode during a frame frequency period to obtain a narrow viewing angle. The method for driving the LCD device includes driving the LCD device in an FFS mode during a frame frequency period to obtain a wide viewing angle, and driving the LCD device in both the FFS mode and a VAC mode during the frame frequency period by dividing the frame frequency period, thereby obtaining a narrow viewing angle.

37 Claims, 8 Drawing Sheets

75 frames/second 75 frames/second

LCD DEVICE CAPABLE OF CONTROLLING A VIEWING ANGLE AND METHOD FOR DRIVING THE SAME

This application claims the benefit of Korean Patent Application 2005-0133926, filed on Dec. 29, 2005, which is hereby incorporated by reference in its entirety.

BACKGROUND

1. Technical Field

The technical field relates to liquid crystal display (LCD) devices, and more particularly, to a method for driving an LCD device, in which the LCD device is driven in a fringe field switching (FFS) mode during a frame frequency period to obtain a wide viewing angle while sub-frames divided from a frame are sequentially driven in both an FFS mode and a viewing angle control (VAC) mode during the frame frequency period to obtain a narrow viewing angle, thereby resulting in that a narrow viewing angle is obtained in view of time average.

2. Discussion of the Related Art

Recently, active matrix LCD devices have become widely used in flat TVs, portable computers, monitors in accordance with their developing performance.

Generally used among the active matrix LCD devices is the twisted nematic (TN) mode LCD device. The TN mode LCD device drives a liquid crystal director twisted at an angle 90° by applying a voltage to electrodes arranged on two substrates.

The TN mode LCD device provides excellent contrast and excellent color reproduction but has a narrow viewing angle.

To solve such a problem relating to the narrow viewing angle of the TN mode LCD device, a fringe field switching (FFS) mode LCD device has been developed, in which a relative electrode and a pixel electrode are formed of transparent conductive materials. The distance between the relative electrode and the pixel electrode is then maintained at a narrow range to drive liquid crystal molecules using a fringe field formed between the relative electrode and the pixel electrode.

FIG. 1 is a sectional view illustrating the related art FFS mode LCD device.

First, as shown in FIG. 1, a TFT array substrate 11 of the related art FFS mode LCD device includes gate lines (not shown) and data lines 15 formed of opaque metal, orthogonally crossing each other to define sub pixels, common lines (not shown) arranged in parallel with the gate lines, thin film transistors switching on/off a voltage at crossing portions of the gate and data lines, and relative and pixel electrodes 24 and 17 formed of a transparent conductive material, insulated by an insulating layer, and overlapped with each other within pixel regions. At this time, the relative electrodes are in contact with the common lines.

In more detail, each relative electrode 24 is formed of a plate type transparent conductor within the pixel region. The pixel electrodes 17 are forked along the data lines, and slits 60 are respectively formed between the forked pixel electrodes. At this time, a Vcom signal is transmitted to the relative electrode 24 and a pixel signal passing through the thin film transistor is transmitted to the pixel electrode 17, so that a fringe field occurs between the relative electrode 24 and the pixel electrode 17.

Each of the slits 60 has a width of 2 μm to 6 μm. Liquid crystals are driven by the fringe field formed between the pixel electrode 17 and the relative electrode 24. In other words, the liquid crystals initially aligned by rubbing in case of no voltage are rotated by the fringe field to transmit light.

Additionally, a color filter array substrate 21 is bonded to the TFT array substrate 11 by interposing a liquid crystal layer 31 in between. The color filter array substrate 21 includes R/G/B color filter layers 23 arranged at constant intervals to display colors, and a black matrix layer 22 that serves to divide R/G/B cells from one another and shield light.

The respective color filter layers 23 are formed to allow each sub-pixel to have one color. The sub-pixels having R/G/B colors are independently driven, and a color of one pixel is displayed by combination of the sub-pixels.

The R/G/B color filter layers 23 are arranged depending on their arrangement methods such as a stripe arrangement, a mosaic arrangement, a delta arrangement, and a quad arrangement. The R/G/B color filter layers 23 are variously arranged depending on the size of an LCD panel, a shape of the color filter array, and color arrangement.

The aforementioned LCD device is driven in such a manner that image signals are applied to the data lines and electric pulses are applied to the gate lines in a scan manner. In order to improve picture quality, one gate pulse voltage is applied to each gate line in a sequential driving manner using a gate scan input device. In this way, if the gate pulse voltages are all applied to the gate lines, one frame is completed.

In other words, if the gate pulse voltage is applied to the nth gate line, all the thin film transistors connected with the gate line to which the gate pulse voltage is applied are turned on. Image signals of the data lines are stored in a liquid crystal cell and a storage capacitor through the turned-on thin film transistor.

Therefore, the liquid crystal molecules in the liquid crystal cell are rearranged in accordance with the image signals stored in the liquid crystal cell and the voltages of the image signals to allow light of a backlight to pass through the liquid crystal cell, thereby displaying a desired screen.

Although a related art FFS mode LCD device has a wide viewing angle, a narrow viewing angle is required to prevent personal information from being exposed to other persons. Thus, a viewing control layer or sub-pixels for controlling a viewing angle may additionally be provided. However, there often is a low viewing control effect, and the process of forming the sub-pixels for controlling a viewing angle and the driving method for controlling the sub-pixels are complicated.

Hence, the driving method of controlling the viewing angle of the sub-pixels is complicated because a new electrode layer as a viewing control layer must be added and then a signal must be applied to the new electrode layer.

SUMMARY

Accordingly, described herein is a method for driving an LCD device, which substantially obviates one or more problems due to limitations and disadvantages of the related art.

Described herein is a method for driving an LCD device in a fringe field switching (FFS) mode during a frame frequency period to obtain a wide viewing angle and further driving the LCD device in both the FFS mode and a viewing angle control (VAC) mode during the frame frequency period by dividing the frame frequency period, thereby obtaining a narrow viewing angle. Accordingly, the narrow viewing angle is obtained in view of time average.

The LCD device comprises a plurality of gate and data lines orthogonally crossing each other on a first substrate to define a plurality of sub-pixels. The LCD device further comprises thin film transistors arranged at each crossing portion where the gate lines cross the data lines and has plate type first common electrodes formed in the sub-pixels. The pixel electrodes are further connected to the thin film transistors and insulated from the first common electrodes, in which a plurality of slits formed. The LCD device additionally includes a second substrate bonded to the first substrate by interposing a liquid crystal layer in between, and plate type second common electrodes are formed on the second substrate. The LCD device further comprises a driving mechanism coupled with the first common electrodes and the second common electrodes. Alternatively, the driving mechanism may be coupled with the first common electrodes and another set of electrodes, such as the pixel electrodes. The driving mechanism of the LCD device is operative to drive the LCD device in a fringe field switching (FFS) mode during a frame frequency period to obtain a wide viewing angle. The driving mechanism is further operative to drive the LCD device in both the FFS mode and a viewing angle control (VAC) mode during the frame frequency period by dividing the frame frequency period, thereby obtaining a narrow viewing angle.

BRIEF DESCRIPTION OF THE DRAWINGS

The disclosure includes the following detailed description and reference to the accompanying drawings, in which.

DETAILED DESCRIPTION

Reference will now be made in detail to the examples, which are illustrated in the accompanying drawings. Wherever possible, the same reference numbers will be used throughout the drawings to refer to the same or like parts.

Figure 1:
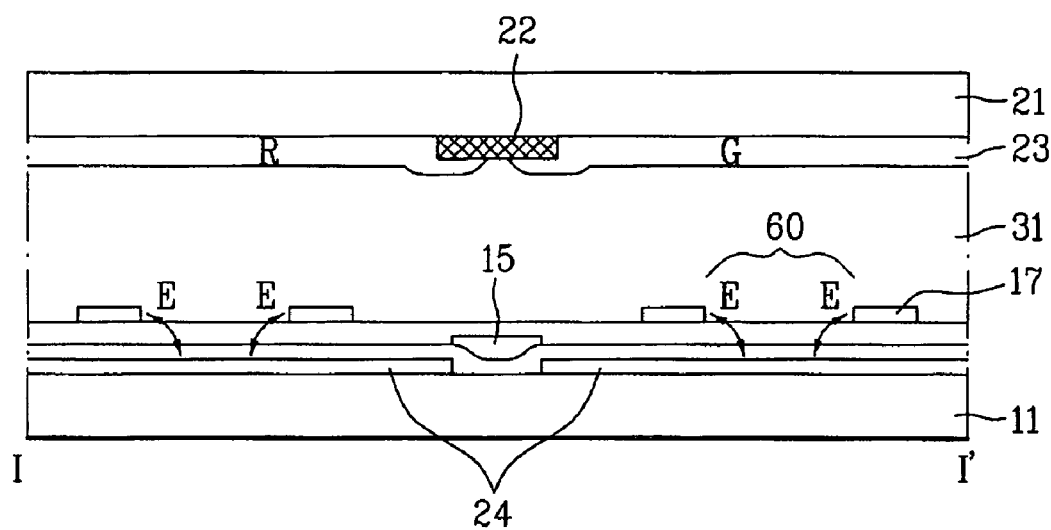
FIG. 1 is a sectional view illustrating a related art FFS mode LCD device.
Figure 2:
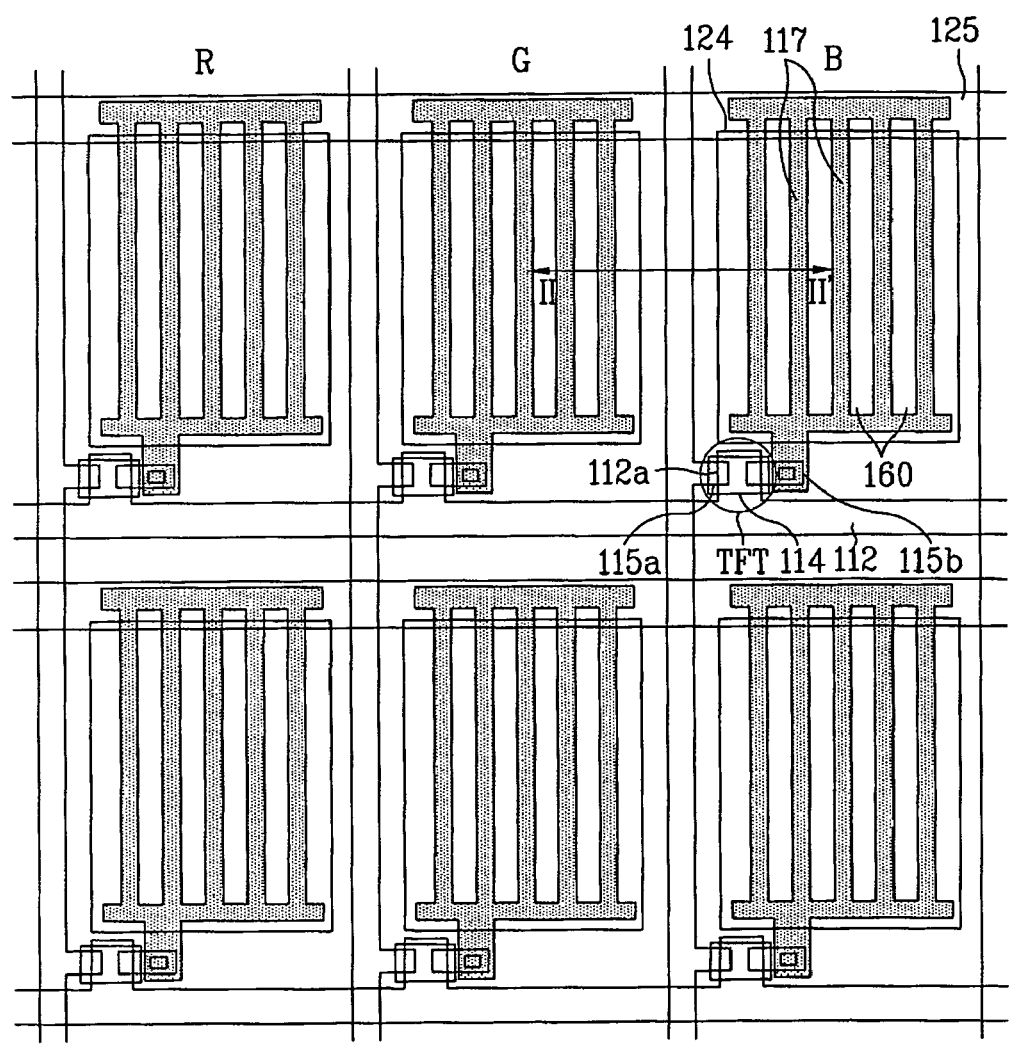
FIG. 2 is a plane view illustrating one example of an LCD device capable of controlling a viewing angle.
Figure 3:
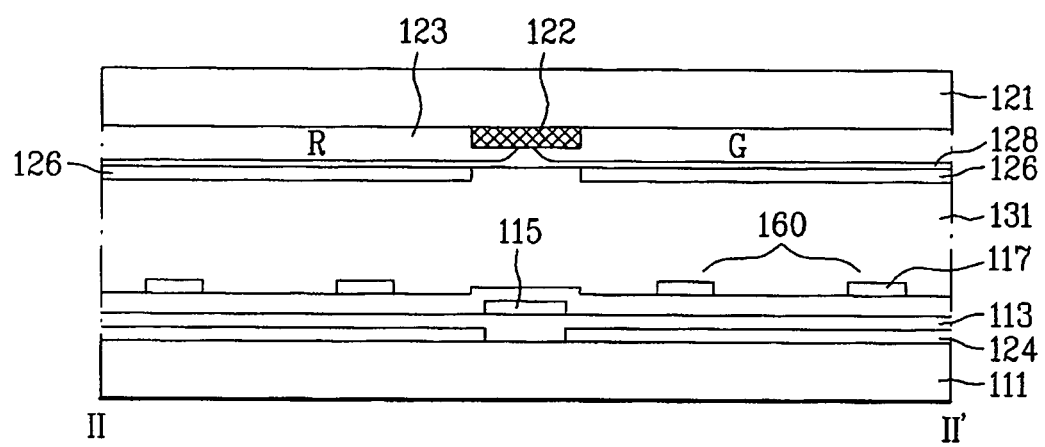
FIG. 3 is a sectional view taken along line I~I' of FIG. 2.

As shown in FIGS. 2 and 3, the LCD device includes a TFT array substrate 111 and a color filter array substrate 121, wherein the TFT array substrate 111 is bonded to the color filter array substrate 121 by interposing a liquid crystal layer 131 in between. The TFT array substrate 111 includes thin film transistors serving as switching elements in each sub-pixel, and first common electrodes 124 and pixel electrodes 117. The first common electrodes 124 and the pixel electrodes 117 form a fringe field. The color filter array substrate 121 includes second common electrodes 126 for controlling a viewing angle.

In more detail, the TFT array substrate 111 includes gate lines 112 and data lines 115 insulated from each other by a gate insulating layer 113, orthogonally crossing each other to define R, G and B sub-pixels. The TFT array substrate 111 also includes thin film transistors switching on/off voltage at crossing portions of the gate and data lines, each of the thin film transistor including a gate electrode 112a, a gate insulating layer 113, a semiconductor layer 114 and source and drain electrodes 115a and 115b, common lines 125 arranged in parallel with the gate lines, plate type first common electrodes 124 formed in the sub-pixels and contacted with the common lines to which a Vcom1 signal is applied, and pixel electrodes 117 insulated from the first common electrodes 124 and contacted with the drain electrode 115b of the thin film transistor to apply a pixel signal thereto. Slits 160 are formed between the forked pixel electrodes of each sub-pixel. A fringe field is formed between the first common electrodes and the pixel electrodes through the slits 160 to drive the liquid crystal layer 131.

The thin film transistor array substrate 111 is bonded to the color filter array substrate 121 by interposing the liquid crystal layer 131 in between. The color filter array substrate 121 includes a black matrix layer 122 that serves to divide R/G/B cells from one another and shield light, and R/G/B color filter layers 123 are arranged at constant intervals to display colors. The color filter array substrate 121 further includes an overcoat layer 128 formed on the entire surface, including the color filter layers, to remove a surface step difference of the substrate and plate type second common electrodes 126 formed in the R, G and B sub-pixels to oppose the first common electrodes.

Since the first common electrodes 124, the second common electrodes 126 and the pixel electrodes 117 are formed of a transparent conductive material such as indium tin oxide (ITO) or indium zinc oxide (IZO), they have little affect on aperture ratio.

The first common electrodes 124 are in contact with the common lines 125 so that a Vcom1 signal (not shown) is transmitted from the contour of the active region. The second common electrodes 126 are connected with one another to form a single body and are supplied with a Vcom2 signal (not shown) from the contour of the active region. The pixel electrodes are in contact with the drain electrode 115b so that an image signal is supplied thereto.

Meanwhile, an alignment layer is further provided inside the TFT array substrate and the color filter array substrate so that liquid crystal molecules are initially arranged in a desired direction, and a polarizing plate is further provided outside the two substrates to polarize natural light. The alignment layer is rubbed for initial alignment in the range of 0° or 90°. A lower polarizing plate attached onto the outside of the TFT array substrate has a polarizing axis vertical to that of an upper polarizing plate attached onto the outside of the color filter array substrate. One of the polarizing axes of the upper and lower polarizing plates is designed to become identical with the initial alignment direction of the liquid crystal.

Figure 4A:
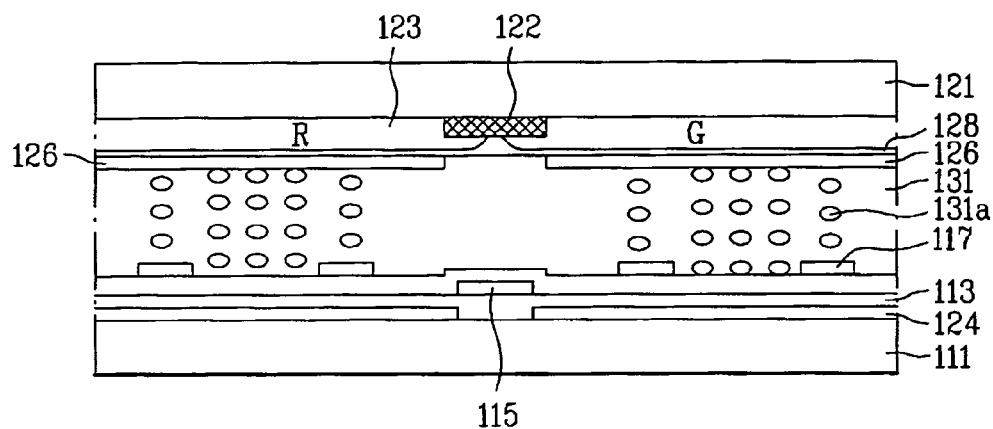
FIGS. 4A and 4B are sectional views illustrating a wide viewing angle mode of an LCD device capable of controlling a viewing angle.

In order to drive the LCD device in a wide viewing angle mode, R, G and B sub-pixels are driven in an FFS mode, thereby improving the viewing angle. As shown in FIG. 4A, if no voltage is applied to the first common electrodes 124 and the pixel electrodes 117, liquid crystal molecules 131a are maintained at the initial arrangement state. The incident light through the lower polarizing axis vertical to the initial alignment direction of the liquid crystal molecules does not pass through the liquid crystal layer 131, thereby displaying the black state.

Figure 4B:
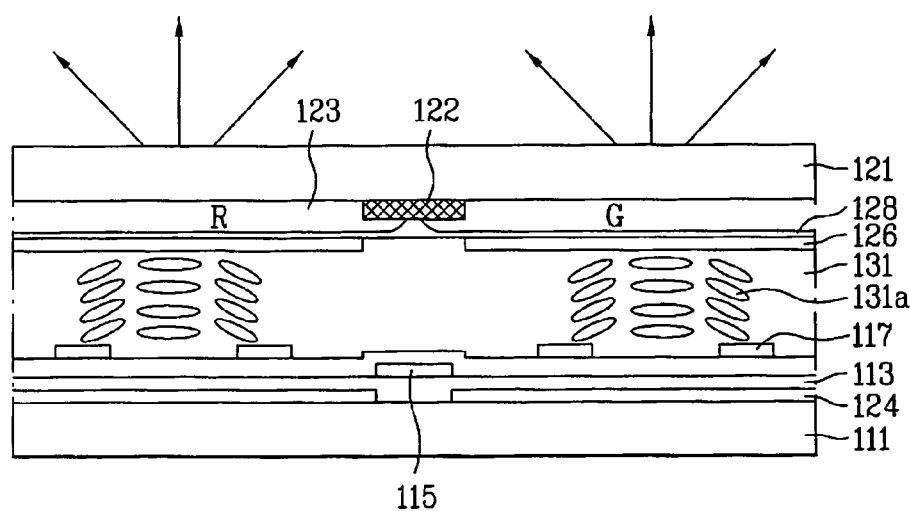

As shown in FIG. 4B, if the Vcom1 signal is applied to the first common electrodes 124 and the pixel voltage is applied to the pixel electrodes 117, the fringe field is formed between the first common electrodes 124 and the pixel electrode 117. The liquid crystal molecules 131a are horizontally twisted by the fringe field. Therefore, the light passing through the lower polarizing axis passes through the upper polarizing axis, thereby displaying the white state.

Figure 5:
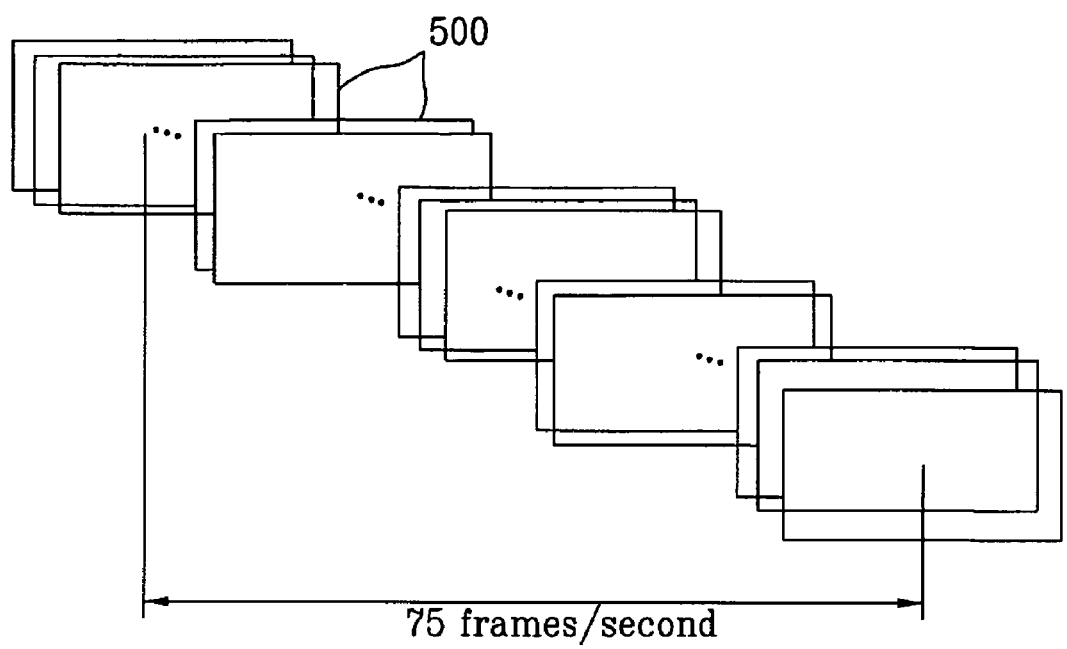
FIG. 5 illustrates a frame provided during a wide viewing angle mode according to one example of an LCD device capable of controlling a viewing angle.

During the wide viewing angle mode, the LCD device is driven in the FFS mode. In order to drive the LCD device in the FFS mode, no signal is applied to the second common electrodes 126 and thus the second common electrodes are floated. As shown in FIG. 5, when one frame time is determined as 1/75 second and 75 frames are provided per one second by time division, a frame 500 of the FFS mode is only provided for one second (frame frequency period).

Unlike the wide viewing angle mode, a VAC mode frame is inserted in the middle of the FFS mode frame to drive the LCD device in a narrow viewing angle mode. To drive the VAC mode frame, an electric field is formed between the first common electrodes and the second common electrodes.

The same voltage as that of the wide viewing angle mode is applied to the first common electrodes 124, and a voltage having the potential difference of 1V~4V or −4V~−1V from the voltage applied to the first common electrodes 124 is applied to the second common electrodes 126, so that the vertical electric field is formed between the first common electrodes and the second common electrodes. At this time, the pixel voltage of the pixel electrodes 117 is the same as the Vcom1 signal applied to the first common electrodes or a voltage less than a threshold voltage is applied to the pixel electrodes 117.

The VAC mode is described in detail with reference to FIG. 6.

Figure 6A:
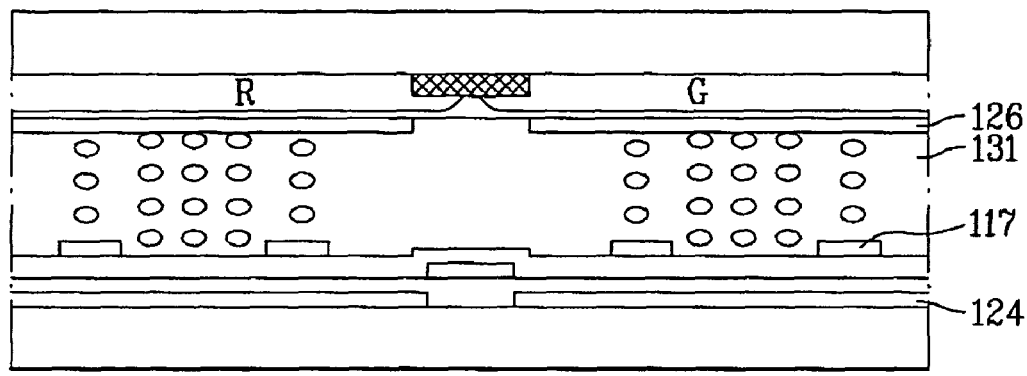
FIGS. 6A and 6B are sectional views illustrating a narrow viewing angle mode.

As shown in FIG. 6A, if no voltage is applied to the first and second common electrodes 124 and 126 and the pixel electrodes 117 of the R, G and B sub-pixels, the incident light through the lower polarizing axis does not pass through the liquid crystal layer in the same manner as the wide viewing angle mode, thereby displaying the black state.

Figure 6B:
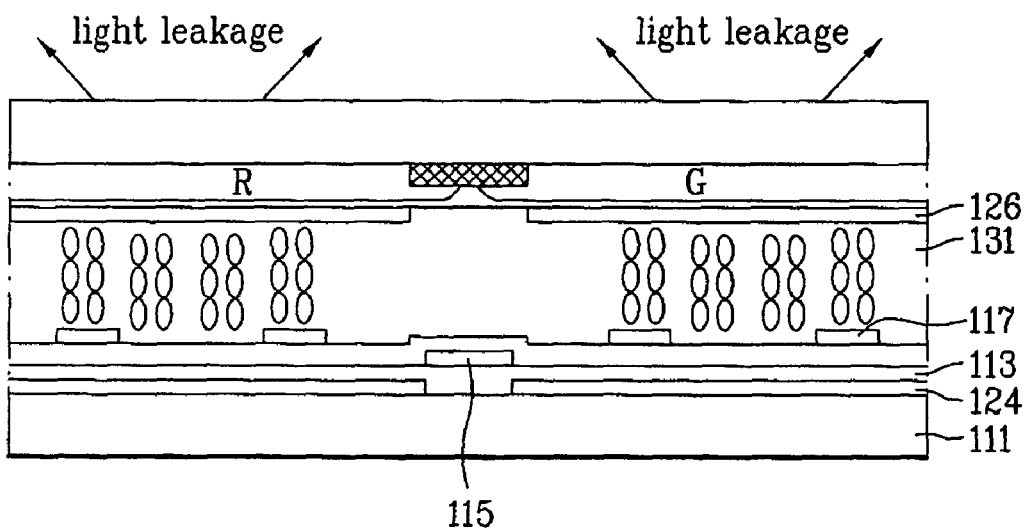

In this state, if the Vcom1 signal is applied to the first common electrodes 124, the Vcom2 signal having constant potential difference (ex, potential difference of 1V~4V or −4V~−1V) from the Vcom1 signal is applied to the second common electrodes 126, and the pixel electrodes 117 are electrically floated, as shown in FIG. 6B, a vertical electric field is formed between the first and second common electrodes to drive the VAC mode. The liquid crystal molecules 131a are then tilted by the vertical electric field, thereby resulting in that light leakage occurs in both viewing angle directions. In addition that the pixel electrodes 117 may electrically be floated, as described above, it is possible that the pixel voltage equal to the Vcom1 signal is applied to the first common electrodes or a voltage less than the threshold voltage is applied to the first common electrodes.

Since the liquid crystal molecules are not horizontally twisted but vertically tilted in the VAC mode, it is difficult to observe light from the LCD device regardless of the white state or the black state. However, light leakage occurs in both viewing angle directions. The light leakage generated in the black state rapidly increases black luminance to deteriorate contrast ratio. As a result, the viewing angle of the LCD device is reduced to obtain a narrow viewing angle.

As described above, the LCD device is driven in the FFS mode to obtain a wide viewing angle while the VAC mode frame is inserted in the middle of the FFS mode frame to obtain a narrow viewing angle, whereby the viewing angle is easily controlled. In this case, the frame frequency period of the VAC mode is in the range of ⅓ or less of the frame frequency period of the FFS mode so that the image of the VAC mode cannot be recognized more strongly than the image of the FFS mode.

Figure 7:
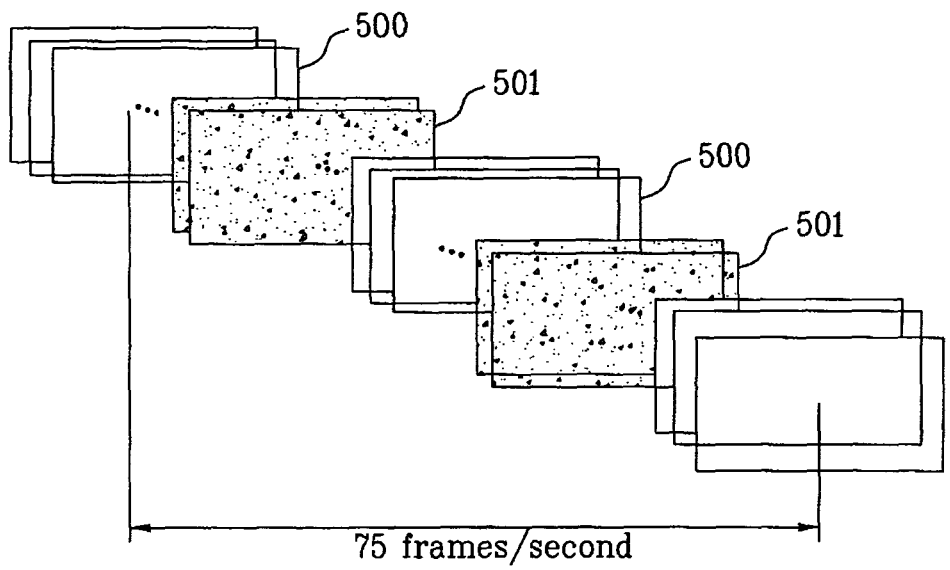
FIG. 7 illustrates one example of a frame provided during a narrow viewing angle mode.

As shown in FIG. 7, when one second is set as the frame frequency period, the LCD device is driven such that the frame of the VAC mode is inserted between the frames of the FFS mode during the frame frequency period.

In other words, after the FFS mode frame 500 is provided three or four times, the VAC mode frame 501 is provided two times. This step is repeated once more. In this way, the FFS mode frame and the VAC mode frame are alternately provided to obtain a narrow viewing angle.

For example, if the frame is provided for 1/75 second, 75 frames are provided for one second (frame frequency period). In this case, 60 frames are driven in the FFS mode and 15 frames are driven in the VAC mode. In this manner, 15 frames of the VAC mode are divisionally inserted among 60 frames of the FFS mode to obtain the narrow viewing angle.

Similarly, if 120 frames are provided for one second, 80 frames are driven in the FFS mode and 40 frames are driven in the VAC mode. Accordingly, 40 frames of the VAC mode are divisionally inserted among 80 frames of the FFS mode to obtain the narrow viewing angle.

Figure 8:
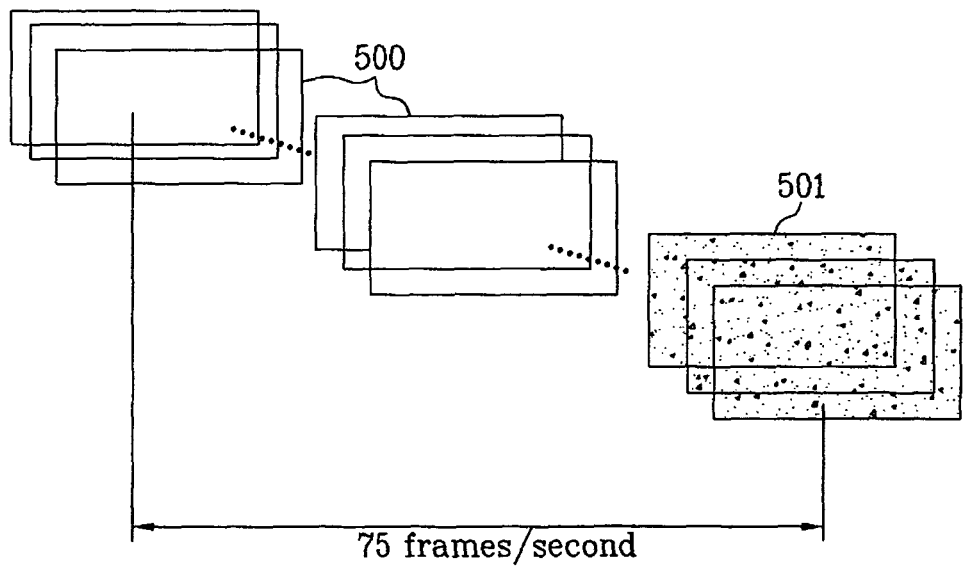
FIG. 8 illustrates another example of a frame provided during a narrow viewing angle mode.

As shown in FIG. 8, after the FFS mode frame 500 continues to be provided during the frame frequency period, the VAC mode frame 501 is provided to obtain the narrow viewing angle.

The narrow viewing angle may be obtained in such a manner that the FFS mode frame 500 is provided after VAC mode frame 501 continues to be provided during the frame frequency period.

For example, if 75 frames are provided for one second, 60 frames of the FFS mode are all provided during the former period or the latter period of the frame frequency period and 15 frames of the VAC mode are provided during the other frame frequency period.

Similarly, if 120 frames are provided for one second, 80 frames of the FFS mode are all provided during the former period or the latter period of the frame frequency period and 40 frames of the VAC mode are provided during the other frame frequency period.

Figure 9:
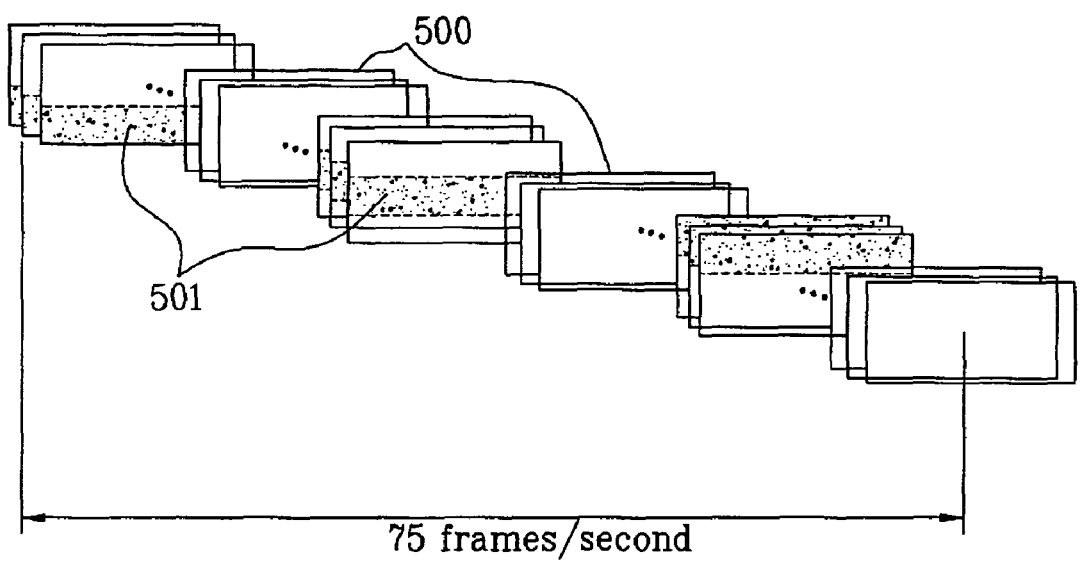
FIG. 9 illustrates yet another example of a frame provided during a narrow viewing angle mode.

Furthermore, as shown in FIG. 9, the frames provided during the frame frequency period are divided into sub-frames to sequentially drive an FFS mode sub-frame 500a and a VAC mode sub-frame 501a, thereby obtaining the narrow viewing angle. In this case, a divided display area method (DDAM) may be used, in which a display area is driven by being divided into several periods. This method may be used when the user's recognition for the VAC mode is low.

After one frame is divided into sub-frames, some sub-frames are driven in the VAC mode while remaining sub-frames are driven in the FFS mode. In this manner, the sub-frames driven in the VAC mode are driven during the frame frequency period in a sequential scan manner, and the providing time of the VAC mode sub-frames is in the range of ⅓ of the providing time of the FFS mode sub-frames.

For example, if 75 frames are provided for one second, after the frames are divided into the sub-frames, the sub-frames of the VAC mode are inserted between those of the FFS mode so that they are to be driven in a scan manner. In this case, the providing time of the sub-frames of the VAC mode is the same as that of 15 frames of the VAC mode. That is, the sub-frames of the VAC mode are provided for 15/75 seconds during the frame frequency period.

Similarly, if 120 frames are provided for one second, after the frames are divided into the sub-frames, the sub-frames of the VAC mode are inserted between those of the FFS mode so that they are to be driven in a scan manner. In this case, the providing time of the sub-frames of the VAC mode is the same as that of 40 frames of the VAC mode. That is, the sub-frames of the VAC mode are provided for 40/120 seconds during the frame frequency period.

Therefore, in using the above described method, the LCD device is first driven in the FFS mode during the frame frequency period to obtain a wide viewing angle while sub-frames are divided from a frame and then the sub-frames are sequentially driven in both the FFS mode and the VAC mode during the frame frequency period to obtain a narrow viewing angle, thereby controlling the viewing angle.

Furthermore, to obtain the narrow viewing angle of the LCD device, the second common electrodes are additionally provided on a color filter array substrate. When the second common electrodes are formed in a single body to obtain the narrow viewing angle, another signal is applied to the second common electrodes.

Additionally, a related art device for controlling a viewing angle includes one cell type in which one cell is used as a main driving pixel and a viewing angle control pixel, and a two cell type in which a main driving pixel and a viewing angle control pixel are separately provided. In comparison with the related art one cell type device, the LCD device capable of controlling a viewing angle provides a luminance comparative to that of an existing FFS panel without distortion (liquid crystal disclination), reduces luminance loss at the front by controlling the number of the VAC mode frames during a narrow viewing angle mode, and allows for a viewing control effect.

In comparison with the related art two cell type device, since the LCD device capable of controlling a viewing angle does not need a pixel for controlling a viewing angle, the process steps are simplified and the cost is reduced. The LCD device capable of controlling a viewing angle may be used in a portable display due to its reduced weight and thin size.

It will be apparent to those skilled in the art that various modifications and variations can be made without departing from the spirit or scope of the disclosure. Thus, it is intended that the present disclosure covers the modifications and variations as they comes within the scope of the appended claims and their equivalents.

What is claimed is:

1. A method for driving an LCD device capable of controlling a viewing angle comprising:
   driving the LCD device in an fringe field switching (FFS) mode during a frame frequency period to obtain a wide viewing angle; and
   driving the LCD device in both the FFS mode and a viewing angle control (VAC) mode during the frame frequency period by dividing the frame frequency period, thereby obtaining a narrow viewing angle;
   wherein the LCD device comprises a plurality of pixel electrodes formed on a first substrate, a plurality of first common electrodes formed on the first substrate including the pixel electrodes, and a plurality of second common electrodes formed on a second substrate bonded to the first substrate by interposing a liquid crystal layer in between; and
   wherein driving the LCD device in both the FFS mode and the VAC mode comprises driving the liquid crystal layer by a vertical electric field formed between the first common electrodes and the second common electrodes when driving the LCD device in the VAC mode.

2. The method of claim 1, wherein dividing the frame frequency period comprises dividing the frequency period of the VAC mode to be approximately ⅓ or less of the frame frequency period of the FFS mode.

3. The method of claim 1, wherein driving the LCD device in both the FFS mode and the VAC mode comprises inserting frames of the VAC mode among frames of the FFS mode during the frame frequency period.

4. The method of claim 1, wherein driving the LCD device in both the FFS mode and the VAC mode comprises providing frames of the VAC mode after providing frames of the FFS mode during the frame frequency period.

5. The method of claim 1, wherein driving the LCD device in both the FFS mode and the VAC mode comprises providing frames of the VAC mode before providing frames of the FFS mode during the frame frequency period.

6. The method of claim 1, wherein driving the LCD device in both the FFS mode and the VAC mode comprises dividing frames provided during the frame frequency period into sub-frames and driving the sub-frames in both the FFS mode and the VAC mode.

7. The method of claim 6, wherein one set of sub-frames are driven in the VAC mode and a second set of sub-frames are driven in the FFS mode.

8. The method of claim 6, wherein the sub-frames driven in the VAC mode are driven in a sequential scan manner.

9. The method of claim 1, wherein 75 frames per second are provided during the frame frequency period.

10. The method of claim 9, wherein driving the LCD device in both the FFS mode and the VAC mode comprises driving 60 frames in the FFS mode and driving 15 frames in the VAC mode.

11. The method of claim 1, wherein 120 frames per second are provided during the frame frequency period.

12. The method of claim 11, wherein driving the LCD device in both the FFS mode and the VAC mode comprises driving 80 frames in the FFS mode and driving 40 frames in the VAC mode.

13. The method of claim 1, wherein driving the LCD device in the FFS mode comprises driving the liquid crystal layer by a fringe field formed between the pixel electrodes and the first common electrodes.

14. The method of claim 13, wherein driving the LCD device in the FFS mode comprises electrically floating the second common electrodes.

15. The method of claim 1, wherein a potential difference of 1V~4V or −4V~−1V is formed between the first common electrodes and the second common electrodes when driving the LCD device in the VAC mode.

16. The method of claim 1, wherein the pixel electrodes are electrically floated and a voltage equal to a signal applied to the first common electrodes is applied to the pixel electrodes.

17. The method of claim 1, wherein the pixel electrodes are electrically floated and a voltage equal to a pixel voltage less than a threshold voltage is applied to the pixel electrodes.

18. The method of claim 1, wherein the liquid crystal layer is horizontally twisted in the FFS mode and vertically tilted in the VAC mode.

19. A liquid crystal display device capable of controlling a viewing angle comprising:
   a plurality of gate and data lines crossing each other on a first substrate to define a plurality of sub-pixels;
   a plurality of thin film transistors arranged at each crossing portion where the gate lines cross the data lines;
   a plurality of plate type first common electrodes formed in the sub-pixels on the first substrate;
   a plurality of pixel electrodes connected to the thin film transistors, formed on the first substrate including the first common electrodes, and insulated from the first common electrodes, in which at least one slit formed;
   a second substrate bonded to the first substrate by interposing a liquid crystal layer in between;

a plurality of plate type second common electrodes formed on the second substrate; and, a driving mechanism coupled with the first common electrodes and one of a second common electrodes or one of a pixel electrodes, wherein the driving mechanism is operative to drive the LCD device in a fringe field switching (FFS) mode during a frame frequency period to obtain a wide viewing angle;

the driving mechanism is further operative to drive the LCD device in both the FFS mode and a viewing angle control (VAC) mode during the frame frequency period by dividing the frame frequency period, thereby obtaining a narrow viewing angle; and the driving mechanism drives the LCD device in both the FFS mode and the VAC mode by driving the liquid crystal layer by a vertical electric field formed between the first common electrodes and the second common electrodes when driving the LCD device in the VAC mode.

20. The liquid crystal display device of claim 19, wherein dividing the frame frequency period comprises dividing the frequency period of the VAC mode to be approximately ⅓ or less of the frame frequency period of the FFS mode.

21. The liquid crystal display device of claim 19, wherein the driving mechanism drives the LCD device in both the FFS mode and the VAC mode by inserting frames of the VAC mode among frames of the FFS mode during the frame frequency period.

22. The liquid crystal display device of claim 19, wherein the driving mechanism drives the LCD device in both the FFS mode and the VAC mode by providing frames of the VAC mode after providing frames of the FFS mode during the frame frequency period.

23. The liquid crystal display device of claim 19, wherein the driving mechanism drives the LCD device in both the FFS mode and the VAC mode by providing frames of the VAC mode before providing frames of the FFS mode during the frame frequency period.

24. The liquid crystal display device of claim 19, wherein the driving mechanism drives the LCD device in both the FFS mode and the VAC mode by dividing frames provided during the frame frequency period into sub-frames and driving the sub-frames in both the FFS mode and the VAC mode.

25. The liquid crystal display device of claim 24, wherein one set of sub-frames are driven in the VAC mode and a second set of sub-frames are driven in the FFS mode.

26. The liquid crystal display device of claim 24, wherein the sub-frames driven in the VAC mode are driven in a sequential scan manner.

27. The liquid crystal display device of claim 19, wherein 75 frames per second are provided during the frame frequency period.

28. The liquid crystal display device of claim 27, wherein the driving mechanism drives the LCD device in both the FFS mode and the VAC mode by driving 60 frames in the FFS mode and driving 15 frames in the VAC mode.

29. The liquid crystal display device of claim 19, wherein 120 frames per second are provided during the frame frequency period.

30. The liquid crystal display device of claim 29, wherein the driving mechanism drives the LCD device in both the FFS mode and the VAC mode by driving 80 frames in the FFS mode and driving 40 frames in the VAC mode.

31. The liquid crystal display device of claim 19, wherein the sub-pixels comprise R sub-pixels that display a red color, G sub-pixels that display a green color, and B sub-pixels that display a blue color.

32. The liquid crystal display device of claim 19, wherein the driving mechanism drives the LCD device in the FFS mode by driving the liquid crystal layer by a fringe field formed between the pixel electrodes and the first common electrodes.

33. The liquid crystal display device of claim 32, wherein the driving mechanism drives the LCD device in the FFS mode by electrically floating the second common electrodes.

34. The liquid crystal display device of claim 19, wherein a potential difference of 1V~4V or −4V~−1V is formed between the first common electrodes and the second common electrodes when driving the LCD device in the VAC mode.

35. The liquid crystal display device of claim 19, wherein the pixel electrodes are electrically floated and a voltage equal to a signal applied to the first common electrodes is applied to the pixel electrodes when driving the LCD device in the VAC mode.

36. The liquid crystal display device of claim 19, wherein the pixel electrodes are electrically floated and a voltage equal to a pixel voltage less than a threshold voltage is applied to the pixel electrodes when driving the LCD device in the VAC mode.

37. The liquid crystal display device of claim 19, wherein the liquid crystal layer is horizontally twisted in the FFS mode and vertically tilted in the VAC mode.

\* \* \* \* \*